United States Patent [19]

Parsons

[11] Patent Number: 5,074,582
[45] Date of Patent: Dec. 24, 1991

[54] VEHICLE SUSPENSION SYSTEM

[75] Inventor: Bryan N. V. Parsons, Stoney Stanton, United Kingdom

[73] Assignee: Jaguar Cars Limited, England

[21] Appl. No.: 548,112

[22] Filed: Jul. 5, 1990

[30] Foreign Application Priority Data

Jul. 6, 1989 [GB] United Kingdom ............... 8915494

[51] Int. Cl.⁵ .............................................. B60G 11/32
[52] U.S. Cl. ..................................... 280/721; 280/723; 267/274
[58] Field of Search ............... 280/660, 662, 663, 666, 280/670, 673, 675, 689, 723, 721, 112.2, 726, 724, 695, 664, 665, 700; 267/193, 274

[56] References Cited

U.S. PATENT DOCUMENTS

| | | | |
|---|---|---|---|
| 1,137,741 | 5/1915 | Charley | 267/193 |
| 2,165,033 | 7/1939 | Dauben | 280/695 |
| 2,245,809 | 6/1941 | Olley | 280/721 |
| 2,852,269 | 9/1958 | Gaines | 280/721 |
| 3,104,097 | 9/1963 | Kozicki | 280/721 |
| 3,147,990 | 9/1964 | Wettstein | 280/723 |
| 3,236,514 | 2/1966 | Van Winsen | 267/193 |
| 4,143,887 | 3/1979 | Williams et al. | 280/723 |
| 4,203,615 | 5/1980 | Cislo et al. | 280/689 |

FOREIGN PATENT DOCUMENTS

| | | | |
|---|---|---|---|
| 3323026 | 1/1985 | Fed. Rep. of Germany | 280/721 |
| 1028316 | 5/1966 | United Kingdom | |

Primary Examiner—Charles A. Marmor
Assistant Examiner—Tamara L. Finlay
Attorney, Agent, or Firm—Davis, Bujold & Streck

[57] ABSTRACT

A vehicle suspension system includes a roll frame pivotally mounted transverse of the vehicle, the roll frame has an arm at either end, the arms extending longitudinally of the vehicle, a wishbone is pivottaly supported on each of the arms outboard thereof, each wishbone forming part of a linkage for supporting a different wheel of the vehicle.

15 Claims, 3 Drawing Sheets

VEHICLE SUSPENSION SYSTEM

BACKGROUND OF THE INVENTION

The present invention relates to a vehicle suspension system and in particular to a vehicle suspension system which will reduce vehicle roll.

In order to reduce vehicle roll, it is desirable that the roll centre of the suspension is as near as possible to the height of the centre of gravity of the vehicle. In conventional suspension systems, increasing the height of the roll centre has the disadvantage that wheel scrub is also increased with adverse effects on vehicle stability and tyre wear.

The present invention provides a vehicle suspension system with high roll centre and low scrub.

SUMMARY OF THE INVENTION

According to one aspect of the present invention, a vehicle suspension system comprises a roll frame mounted for pivotal action about an axis transverse of the vehicle and being biassed to a central position, said roll frame having a pair of arms one on either side of the vehicle which, when the roll frame is in its central position, extend longitudinally or substantially longitudinally of the vehicle, a wishbone being supported outboard on each of said arms, said wishbone being mounted to the arm for pivotal movement about an axis longitudinally or substantially longitudinally of the vehicle, each wishbone forming part of a linkage supporting a different wheel of the vehicle.

With the suspension disclosed above, upward and downward movement of the wheel relative to the vehicle body will be permitted by pivotting of the roll frame and also each individual wishbone and the wheel support linkage associated therewith. Pivotting of the roll frame will cause the wheels on either side of the vehicle to move upwardly or downwardly together while the wishbone and associated linkages will provide for independent movement of the wheels. The wishbone and associated linkage will provide a high roll centre but with the disadvantage of having high scrub. However, as some of the movement of the wheel will be accommodated by pivotting of the roll frame which will have a very high roll resistance and substantially zero scrub, the overall effect is to provide a suspension with high roll centre and low scrub.

According to a further aspect of the present invention, the wishbones on either side of the suspension may be interconnected by spring means, to provide for interaction of the wheels on either side of the vehicle.

In a preferred embodiment of the invention, suspensions as described above are provided at the front and rear axles of the vehicle. With such suspensions, the roll frames may be configured to provide at the front an anti-dive configuration and at the rear an anti-squat configuration. Furthermore, the front and rear roll frames may be interconnected by spring means to provide interaction between the wheels on the front and rear axles.

BRIEF DESCRIPTION OF THE DRAWINGS

Various embodiments are now described, by way of example only, with reference to the accompanying drawings, in which.

DESCRIPTION OF A PREFERRED EMBODIMENT

Figure 1:
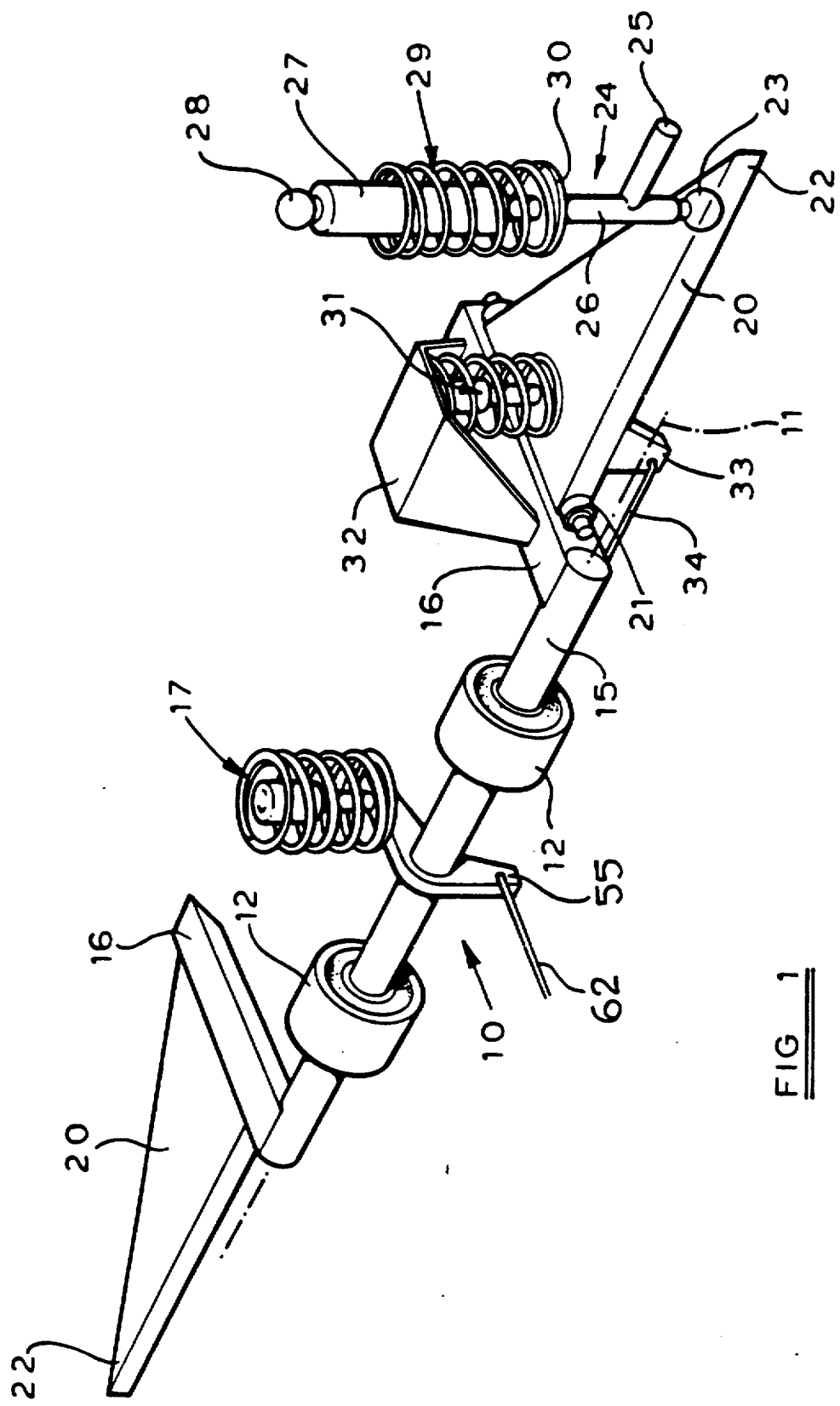
FIG. 1 illustrates a suspension system in accordance with the present invention.

In the suspension system illustrated in FIG. 1 which may be used on any axle of a vehicle, a roll frame 10 is mounted transversely of the vehicle for pivotal movement about axis 11. The roll frame 10 may be pivotally mounted with respect to the vehicle by any suitable means but preferably by means of rubber bushes 12 which will isolate vibrations from the vehicle chassis whilst providing good transverse location.

The roll frame 10 comprises a transverse member 15 with arms 16 at either end, the arms 16 extending parallel to one another longitudinally of the vehicle. Spring and damping means 17 acts between a bracket on transverse member 15 to bias the roll frame 10 to a central position in which the arms 16 are generally horizontal. Orientation of the arms 16 may however be adjusted to provide anti-squat, or anti-dive characteristics as desired, as described below with reference to FIG. 3.

Wishbones 20 are pivotally mounted with respect to each of the arms 16. Again the pivotal connections 21 with the arms 16 may be of any suitable design, rubber mounted bushes being preferred to provide further isolation of vibration. The outer end 22 of each of the wishbones 20 provides a lower pivotal mounting 23 for a telescopic strut 24, a stub axle 25 being mounted on the lower part 26 of the strut 24 and the upper part 27 of the strut 24 being Connected to the vehicle body by pivotal mount 28, in known manner. The strut 24 may be in the form of a hydraulic damper and spring means 29 may act between a reaction plate 30 on the lower part 26 of the strut 24 and the vehicle body. Alternatively, or in addition, spring and damping means 31 may act between the wishbone 20 and a bracket 32 secured to the arm 16.

Figure 3:
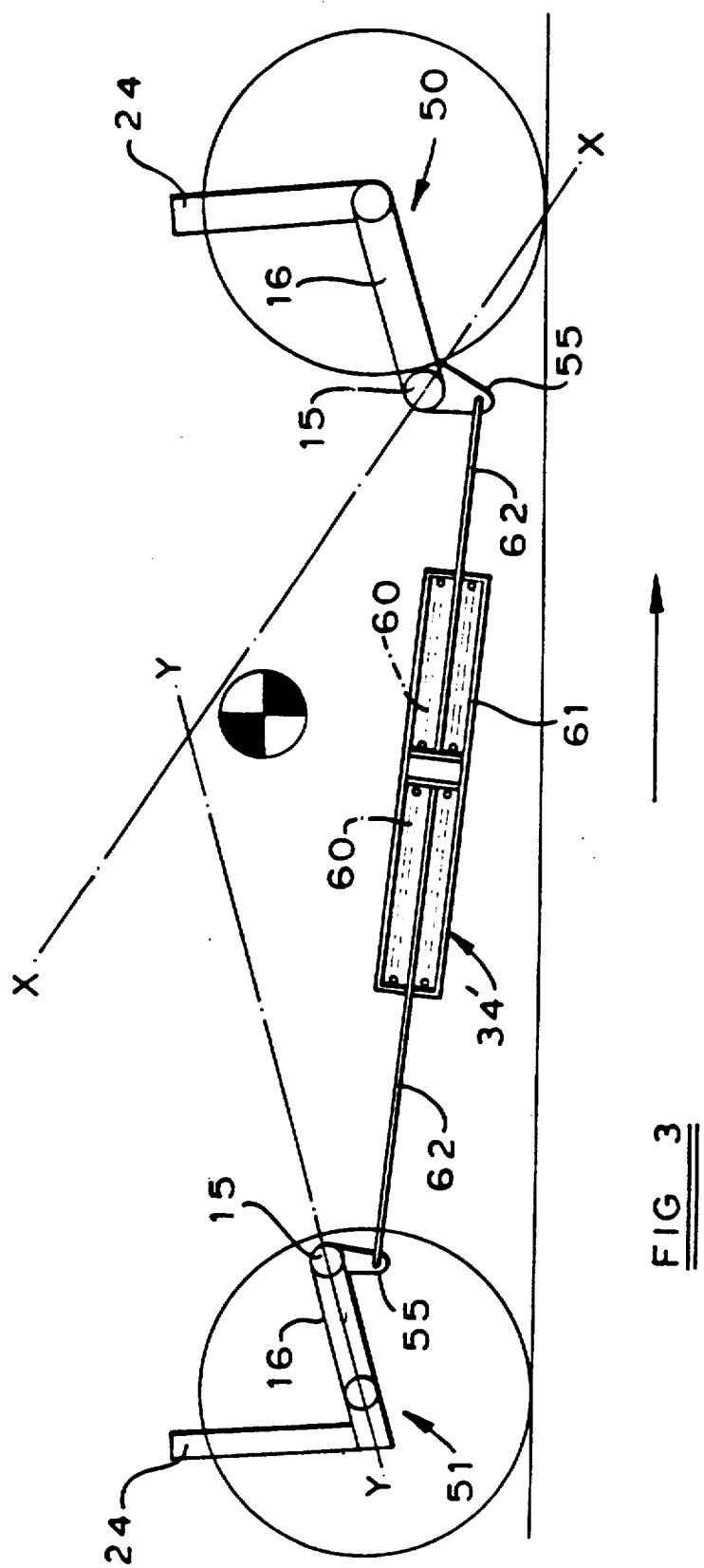
FIG. 3 illustrates a vehicle with a suspension system as illustrated in FIG. 1 on both the front and rear axles.

The wishbones 20 on either side of the roll frame 10 have projections 33 which are interconnected by a spring link 34. Upon movement of the wishbone 20 on one side of the vehicle, the spring link 34 will apply a load to the wishbone 20 on the other side of the vehicle urging that wishbone 20 to move in the opposite direction. In this manner, if the wheel on one side of the vehicle engages a bump or depression in the road surface so that the wishbone on that side moves upwardly or downwardly respectively, a load will be applied to the wishbone on the other side urging it to move in the opposite direction, this providing a self levelling effect. A suitable form of spring link is illustrated in FIG. 3 and is described below with reference to that figure.

The suspension system described above is in effect two separate systems. The roll frame 10 permits the wheels on either side of the vehicle to move upwardly or downwardly together, while the wishbones 20 and telescopic struts 24 provide for independent movement of each wheel.

In a typical example:

If: effective Roll Frame stiffness = 30 N/mm at wheel
  effective Wishbone stiffness = 30 N/mm at wheel
Then with a load of 30 N applied to the wheel
  Roll Frame deflection = 0.5 mm
  Wishbone deflection = 1.0 mm
Therefore the effective stiffness = 20 N/mm at the wheel;

```
                                        -continued
If      the Roll Centre height  =       400 mm
        Centre of Gravity       =       500 mm
        Front axle weight       =       1000 kg
        Front track             =       1500 mm
Then    Roll torque at 1 g      =       9.81 × 1000 × 100 Nmm
        and Roll Rate           =       1.67°/g
When a load of 30 N is applied to the axle
        Roll Frame deflection   =       1.0 mm
        Wishbone deflection     =       0.5 mm
This will produce scrub         =       0.24 mm
        and an axle rate of 20 N/mm
With a conventional wishbone suspension
        If the wishbone stiffness = 30 N/mm at the wheel;
Then a load of 30 N applied to the axle
        will produce wishbone deflection = 0.5 mm
And consequently for the same scrub as the suspension
described above, for the same total suspension deflection
        the roll centre height  =       133 mm.
This will give a roll rate of 6°/g for stiffness 30 N/mm
at the wheel.
```

As compared with the conventional suspension for the same scrub, the suspension according to the present invention will provide a softer ride with far greater roll stiffness.

Figure 2:
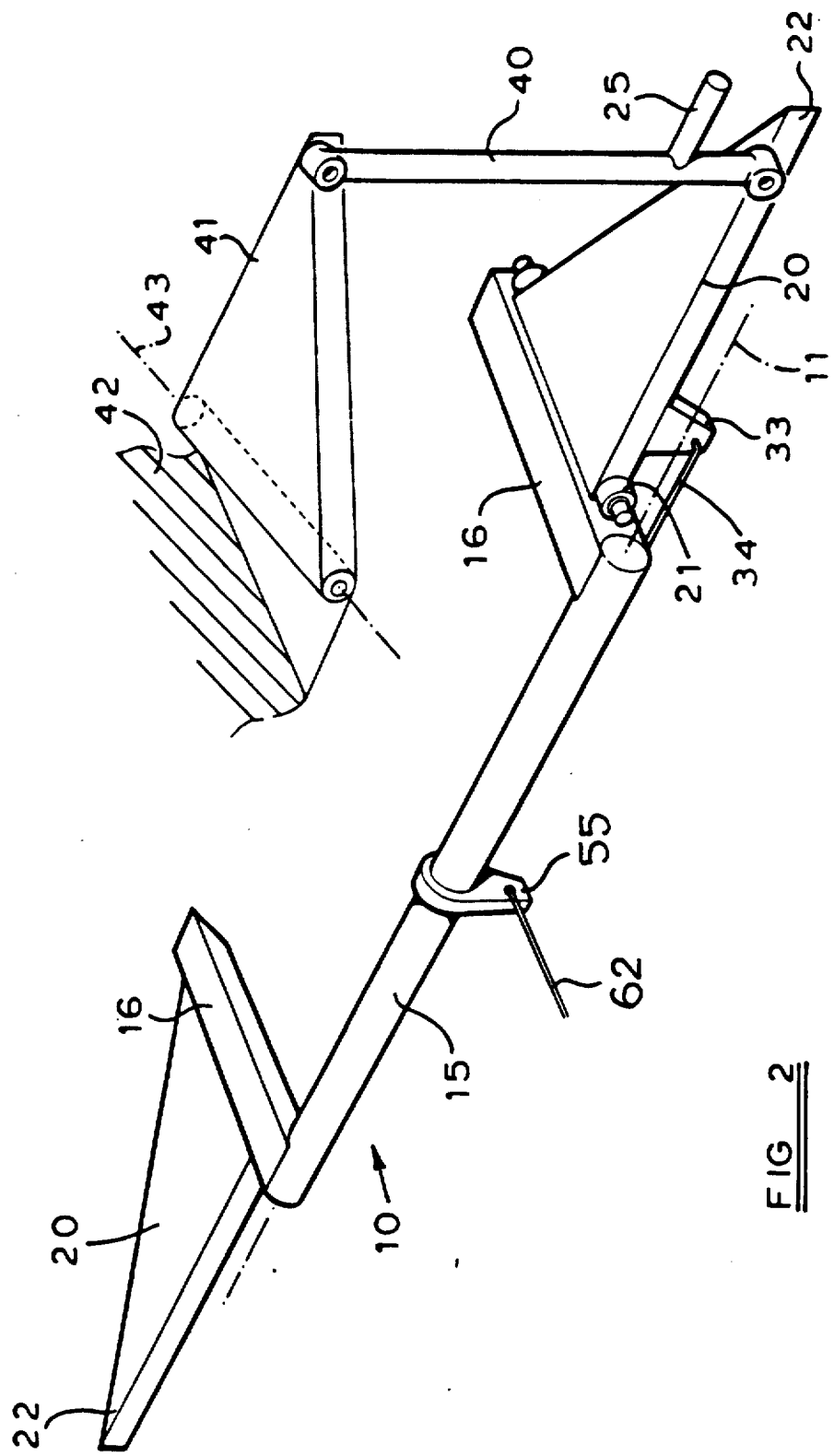
FIG. 2 illustrates an alternative suspension system in accordance with the present invention.

In the further embodiment illustrated in FIG. 2, in place of the telescopic strut 24, a rigid strut 40 carrying the stub axle 25 is pivotally mounted at its lower end to wishbone 20 and at its upper end to a second wishbone 41. The second wishbone 41 is pivotally mounted with respect to the vehicle chassis 42 about an axis 43. The pivotal axis 43 is at a different angle to the pivot axis of wishbone 20 in order to accommodate the combined movement of the lower wishbone 20 and the arm 16. As with the previous embodiment, spring and damping means may be provided between the lower wishbone 20 and a bracket attached to arm 16 and/or between either wishbone 20 or 41 and the vehicle body.

As illustrated in FIG. 3, suspension systems as described with reference to FIG. 1 or FIG. 2 may be provided on both the front and rear axles of the vehicle.

The roll frame 50 of the front axle suspension is mounted with the arms 16 directed forwardly of the transverse member 15. The roll frame 50 being biassed to a central position in which the arms 16 are directed slightly upwardly and the strut 24 or 40 supporting the stub axle 25 is directed rearwardly.

The front suspension is configured such that the line X—X passing through the pivot axis of the roll frame 50 and the point of contact of the wheel with the road surface will pass forwardly of the centre of gravity of the vehicle. With this configuration, the front of the vehicle will tend to rise rather than dive under braking.

The arms 16 of the rear suspension roll frame 51 trail the transverse member 15 and are directed slightly downwardly so that the longitudinal axis Y—Y of the arms 16 pass rearwardly of the centre of gravity, this configuration preventing squat of the rear axle under acceleration.

The transverse members 15 of the roll frames 50 and 51 of the front and rear suspensions are interconnected by a spring linkage 34' which extends between projections 55 secured to the transverse members 15 of roll frames 50 and 51. The spring linkage 34' comprises a pair of compression springs 60 located in a tubular housing 61, the springs acting against reaction elements at opposite ends of the tubular housing 61. Plungers 62 are connected to the brackets 55 and engage adjacent ends of the spring 60, so that the plunger 62 attached to one transverse member 15 is biassed towards the plunger 62 attached to the other transverse member 15. If for example the wheels of the front axle engage a hump in the road surface, so that the wheels move upwardly with respect to the vehicle chassis, the arm 16 of roll frame 50 will rotate about the transverse member 15 in an anti-clockwise direction. This movement of the roll frame 50 will move the plunger 62 attached thereto to the right, thus imposing a load on plunger 62 attached to roll frame 51 which will urge the roll frame 51 to rotate anti-clockwise raising the vehicle chassis with respect to the rear wheels and thus producing a self levelling effect. A similar effect will be produced if the front wheels engage a depression in the road surface or the rear wheels engage humps or depressions in the road surface.

I claim:

1. A vehicle suspension system comprising a roll frame mounted for pivotal action about an axis transverse of the vehicle and being biassed to a central position, said roll frame having a pair of arms one on either side of the vehicle which, when the roll frame is in its central position, extend longitudinall or substantially longitudinally of the vehicle, a wishbone being mounted at its inboard end on each arm for pivotal movement about an axis longitudinally of said arm, each wishborne forming part of a linkage supporting a different wheel of the vehicle.

2. A vehicle suspension system according to claim 1 in which a telescopic strut is pivotally mounted between the wishbone and the vehicle body, the lower part of the telescopic strut which is attached to the wishbone carrying a stub axle to which the vehicle wheel is attached.

3. A vehicle suspension system according to claim 1 in which a rigid strut is pivotally connected between the wishbone and a second wishbone pivotally attached to the vehicle body, the strut carrying a stub axle on which the vehicle wheel is mounted.

4. A vehicle suspension system according to claim 3 in which the second wishbone is mounted with respect to the vehicle body for pivotal movement about an axis which is at a different angle to the pivot axis of the first wishbone, in order to accommodate the combined movement of the first wishbone and the arm.

5. A vehicle suspension system according to claim 1 in which spring and damping means act between the roll frame and vehicle body.

6. A vehicle suspension system according to claim 1 in which spring and damping means act between the wishbone and the vehicle body.

7. A vehicle suspension system according to claim 1 in which spring and damping means act .between the wishbone and arm.

8. A vehicle suspension system according to claim 1 in which the wishbones on either side of the roll frame are interconnected by a spring link.

9. A vehicle suspension system in which suspension systems as claimed in claim 1 are provided on both the front and rear axles of a vehicle.

10. A vehicle suspension system according to claim 9 in which the roll frame of the front suspension is mounted with the arms directed forwardly of the pivotal connection of the roll frame to the vehicle body.

11. A vehicle suspension according to claim 10 in which in its central position, the arms of the roll frame of the front suspension are directed slightly upwardly.

12. A vehicle suspension according to claim 10 in which the projection of the line interconnecting the pivot axis of the roll frame of the front suspension and the point of contact of the front wheels with the road surface passes forwardly of the centre of gravity of the vehicle.

13. A vehicle suspension system according to claim 9 in which the roll frame of the rear suspension is mounted with the arms directed rearwardly of the pivotal connection of the roll frame to the vehicle body.

14. A vehicle suspension according to claim 13 in which in its central position, the arms of the roll frame of the rear suspension are directed downwardly, so that the projection of the longitudinal axes of the arms of the roll frame pass rearwardly of the centre of gravity of the vehicle.

15. A vehicle suspension system according to claim 9 in which the roll frames of the front and rear suspensions are interconnected by a spring linkage.

* * * * *